United States Patent Office 3,625,694
Patented Dec. 7, 1971

3,625,694
POLYMERS, POLYMERIC MORDANTS, AND
ELEMENTS CONTAINING SAME
Hyman L. Cohen, Rochester, N.Y., James R. King, Jr., Los Angeles, Calif., and Louis M. Minsk, Rochester, N.Y., assignors to Eastman Kodak Company, Rochester, N.Y.
No Drawing. Filed June 6, 1968, Ser. No. 734,873
Int. Cl. G03c 1/84, 1/72
U.S. Cl. 96—84                    18 Claims

ABSTRACT OF THE DISCLOSURE

Polymers comprising units having quaternary nitrogen groups and units having reactive anchoring groups thereon which can be reacted directly with gelatin to form covalent bonds between said polymer and gelatin. Photographic dye imbibition printing blanks comprising said polymers exhibit good image definition and low matrix poisoning.

---

This invention relates to novel polymeric materials. In one aspect this invention relates to novel polymers which comprise (1) groups which are effective dye mordants and (2) reactive groups which will react with groups on a binder vehicle, such as a hydrophilic colloid or synthetic polymer, to anchor the mordant in the binder vehicle. In another aspect this invention relates to new imbibition printing blanks and methods of making the same.

Various materials have been used as mordants in imbibition printing and in color photographic products, etc. to prevent migration of dyes. Among the many mordants which have been employed are polymers containing acid salts of tertiary bases such as disclosed in U.S. Pats. 3,048,-487 and 3,184,309, both to Cohen and Minsk. Mordants of these types exhibit good dye retention under certain conditions. However, these mordants can diffuse out of blanks in which they are used and into the matrix when contacted therewith. The result is that as repeated dye transfers are made from a given matrix more mordant diffuses into the matrix and combines with some of the dye and is held there. One approach in the prior art to reduce migration of mordants (i.e. British Pat. 1,022,206) is to provide hardenable groups on the polymeric mordant, such as amino groups, which can be reacted with known photographic hardeners such as aldehydes, di-aldehydes, polyepoxides, and the like to crosslink the polymeric mordant. However, this method of reducing migration is not entirely satisfactory as the hardening agents can preferentially react to crosslink the colloid, thus requiring a high degree of crosslinking before the mordant is immobilized to prevent migration.

Therefore, it is an object of this invention to provide new polymeric mordants.

It is likewise another obejct of this invention to provide new polymeric materials.

It is another object of this invention to provide new polymeric mordants which contain reactive sites which will react directly with a colloid or synthetic vehicle.

It is still another object of this invention to provide means for making new dye imbibition printing blanks.

It is another object of this invention to provide new photographic elements.

We have now found that these and other objects of the invention can be accomplished with novel polymers comprising (1) a quaternary nitrogen atom and (2) a reactive anchoring group which will react directly with at least one group on a colloid or synthetic polymer vehicle to form a covalent chemical bond. In one preferred embodiment of this invention a polymeric mordant containing an aldehyde group (reactive anchoring group) is mixed with gelatin which contains groups which will react with said aldehyde groups. In contradistinctioin, a hardening agent such as formaldehyde is required to achieve substantial hardening when the polymeric mordant contains hardenable groups such as amine groups which do not react readily with the various groupings on gelatin. The polymeric mordants of this invention contain reactive anchoring groups which will react with gelatin to increase the hardness of a gelatinous composition, i.e., such as to reduce the swell rate of a gelatinous layer. In a typical test an emulsion containing one of said polymeric mordants in a concentration of at least about .05 gram of said polymer/gram of gelatin can be incubated at 120° F./50 percent relative humidity and then immersed in water at 25° C. for 3 minutes and it will have a lower percent swell than a control sample containing the same concentration of a similar polymer which does not contain reactive anchoring groups. Typical reactive anchoring groups which can be used according to this invention are aldehyde groups, chloroalkanoyl groups, chloroalkyl groups, vinyl sulfonoxy groups, pyridiniumpropionyl groups, alkyl sulfonoxy groups, acetoacetoxy groups, vinyloxy groups, or vinylcarbonyl groups such as acryloyl or methacryloyl.

The polymers of this invention are composed of recurring units having quaternized nitrogen atoms and reactive anchoring groups. Generally these polymers are ethenic polymers having the characteristic recurring

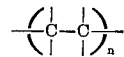

backbone. In one embodiment of the invention it has been found that polymeric materials according to this invention having at least two aromatic nuclei for each quaternized nitrogen atom are good mordants for acids dyes. The aromatic nuclei are preferably monocyclic or carbocyclic aryl groups, but they can also be such groups as pyridyl or pyrazinyl groups. In another preferred embodiment of the invention it has also been found that mordants according to this invention which are substantially free of carboxyl groups provide better image definition in transfer blanks.

The mordants of the invention are generally prepared by quaternizing an intermediate polymer having tertiary nitrogen atoms with an alkylating or arylating agent. The method of preparation of the intermediate polymer containing the tertiary nitrogen atoms for subsequent quaternization is not critical. Any of the methods known in the art such as mass, solution, or bead polymerization, as well as condensation polymerization, can be used, and the catalysts known to the art such as ultraviolet light, peroxides, azo compounds, e.g., azobisisobutyronitrile, etc. can be employed.

It is often advantageous to prepare the intermediate basic polymers as derived polymers such as, for example, the styrene-maleimide polymers described in Cohen and Minsk U.S. Pat. No. 3,048,487 which are made by the reaction of a maleic anhydride interpolymer and a dialkyl-aminoalkylamine. Typical suitable intermediate polymers include copoly[styrene-N-(3-dimethylaminopropyl)acrylamide], copoly[styrene-N - (3 - dimethylaminopropyl) maleimide], copoly(styrene-2 - dimethylaminoethylmethacrylate), copoly(styrene-4-vinylpyridine), poly(2-vinylpyridine), copoly[2-vinylnaphthalene-N - (3 - dimethylaminopropyl)maleimide], copoly[4-vinylbiphenyl-N - (3-dimethylaminopropyl)maleimide], and the like.

Generally these intermediate polymers are addition copolymers comprising at least 20 mole percent of tertiary amine-containing units and preferably at least 50 mole percent, the remainder of the units being derived from other unsaturated monomers.

In an alternate embodiment, the quaternary nitrogen-containing mordants of this invention can be prepared by reacting an intermediate polymer having recurring units containing an active halogen group, for example, a chloroacetyl group, with a tertiary amine, preferably a tertiary amine containing at least one aryl or aralkyl group attached to the nitrogen atom, to obtain directly the quaternary nitrogen-containing mordants of the invention. Intermediate polymers which can be employed in this procedure include poly(vinyl chloroacetate) and copolymers of vinyl chloroacetate and other ethylenically unsaturated monomers. Typical suitable tertiary amines which can be employed in this alternate procedure include N,N-dimethylbenzylamine, N,N-dibenzylmethylamine, N,N-dimethylnaphthylamine, pyridine, and the like.

In general, the novel mordants of this invention contain at least 20 mole percent of units containing quaternary nitrogen groups and at least about 20 mole percent of units containing reactive anchoring groups. In a preferred embodiment, the novel polymers comprise from about 30 to 80 mole percent of units containing reactive anchoring groups. Preferably the quaternary nitrogen atoms and the anchoring groups are located on the same unit of said polymer.

The reactive anchoring groups can be introduced into the polymer after it has been prepared or monomers containing reactive anchoring groups can be used in the preparation of said polymer. In one preferred embodiment a polymer comprising halogen groups is reacted with a tertiary amine compound which also contains aldehyde groups, chloroalkanoyl groups, chloroalkyl groups, vinylsulfonyl groups, pyridiniumpropionyl groups, alkyl sulfonoxy groups, acetoacetoxy groups, vinyloxy groups, or vinylcarbonyl groups. In one embodiment polymers containing units derived from styrene can be chloromethylated, for example by chloromethyl ether. The chloromethylated units are then reacted with a tertiary amine containing a reactive anchoring group such as 3-(dimethylamino) - 2,2 - dimethylpropionaldehyde, or any other tertiary amine containing reactive anchoring group, to produce a unit having a reactive anchoring group and a quaternary nitrogen atom.

In another embodiment a polymer containing units of vinyl toluene is reacted with N-bromosuccinimide in benzene to produce units of vinyl benzyl bromide. These units can then be converted by reaction with a compound such as 3-(dimethylamino)-2,2-dimethylpropionaldehyde to produce a unit having a quaternized nitrogen atom and a reactive anchoring group. In another embodiment chloroacetic anhydride is reacted with a polymer containing units of partially or completely hydrolyzed vinyl acetate.

The resulting chloroacetyl groups can be reacted with 3-(dimethylamino)-2,2-dimethylpropionaldehyde to produce a unit having a quaternary nitrogen atom and a reactive anchoring group. Similar groups can be introduced on the polymer when other compounds such as beta-chloropropionyl isocyanate and the like are used in place of chloroacetic acid.

Another method of preparing the novel polymers of the invention comprises preparing a polymer having appended thereto tertiary nitrogen groups and then quaternizing the nitrogen atoms by reaction with bis(chloroalkyl)arylene compounds, bis-alkylsulfonoxyalkanes or vinyl chloroaliphatic acid esters to yield polymer quaternaries which contain appended chloroalkyl, alkylsulfonoxy or vinyloxy groups respectively as reactive sites for anchoring the mordant. The quaternization can be effected in a polar solvent such as water, dimethylformamide, dimethylsulfoxide, dimethylacetamide, or an alcohol such as methanol, ethanol, isopropanol, Cellosolve, and the like. Generally the quaternization is carried out to quaternize at least 50% of tertiary nitrogen atoms. Temperatures from room temperature to 125° C. or more are generally used and if quaternization of only a part of the tertiary nitrogen atoms is desired, the amount of quaternizing agent can be reduced to correspond with the number of tertiary nitrogen atoms to be converted. Typical units which can be prepared by this method include units derived from N - (4 - chloromethylbenzyl)-N,N-dimethyl-N-(4-vinylbenzyl)ammonium chloride; N-(3-acrylamidopropyl) - N - (4-chloromethylbenzyl)-N,N-dimethylammonium chloride; N-(3-acrylamidopropyl)-N-benzyl-N,N-dimethylammonium chloride; N-(3-acrylamidopropyl) - N,N - dimethyl - N - vinyloxycarbonyl-methylammonium chloride; N-(4-chloromethylbenzyl)-N,N-dimethyl - N - (3-maleimidopropyl)ammonium chloride; and N,N-dimethyl-N-(3-maleimidopropyl)-N-methylsulfonoxypropylammonium methosulfonate.

Yet another method of preparing polymers of the invention comprises preparing a polymer containing appended chloroacetyl groups or beta-chloropropionyl groups as described above and then partially quaternizing the polymer by reaction with a tertiary amine having the structure:

wherein R represents alkyl groups, aryl groups, and arylalkyl groups and wherein at least two of the R's can be taken together with the nitrogen atom to represent an N-heterocyclic aromatic group. Preferred amines are those wherein at least one R is aryl or aralkyl and the N-heterocyclic aromatic compounds. Exemplary of suitable tertiary amines are N,N - dimethylethylamine, N,N - dimethylbenzylamine, N,N - diethylphenylamine, N,N-dimethylnaphthylamine, pyridine, quinoline, and the like.

Monomers containing acetoacetoxy groups can be copolymerized with other monomers having tertiary amine groups, which are subsequently quaternized to provide quaternary ammonium groups in the polymer. The acetoacetoxy groups include those as in acetoacetic ester groups and the like, for example, as disclosed in Smith U.S. Ser. No. 625,593, filed Mar. 24, 1967, now U.S. Pat. 3,488,708, issued Jan. 6, 1970. A typical monomer of this type is 2-acetoacetoxyethyl methacrylate.

Generally, the polymers of this invention are ethenic polymers having the backbone structure

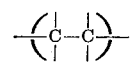

The polymers can be homopolymers which have been partially reacted to append groups on some of the units but preferably the polymers contain dissimilar units in interpolymerized relationship. Typical unsaturated comonomers which can be used to provide some of the intralinear units of polymers according to this invention include ethylene, propylene, 1-butene, isobutene, 2-methylpentene, 2-methylbutene, 1,1,4,4-tetramethylbutadiene styrene, alpha-methylstyrene; monoethylenically unsaturated esters of aliphatic acids such as vinyl acetate, isopropenyl acetate, allyl acetate, etc.; esters of ethylenically unsaturated mono or dicarboxylic acids such as methyl acrylate, methyl methacrylate, ethyl acrylate, diethyl methylene malonate, etc.; monoethylenically unsaturated compounds such as acrylonitrile, allyl cyanide, and dienes such as butadiene and isoprene. In one embodiment a preferred class of unsaturated comonomers which may be used to form some of the intralinear units of copolymers of this invention includes the lower 1-alkenes having from 1 to 4 carbon atoms, styrene and tetramethylbutadiene.

The invention can be further illustrated by the following examples.

EXAMPLE I

Preparation of copoly[styrene:N - vinylbenzyl-N-(2-formyl-2 - methyl)propyl - N,N - dimethylammonium chloride]

Into a 500 ml. one-neck flask, fitted with magnetic stirrer and condenser is placed 50 g. (0.45 mole) of poly(styrene) ($\{\eta\}$ 0.13 in benzene), 112 ml. chloromethyl methyl ether and 146 ml. of ethylene chloride. This mixture is stirred to a homogeneous solution at which time 9.75 g. of anhydrous zinc chloride is added. The reaction mixture is stirred at ambient temperature for 24 hours. To the reaction solution is added 196 ml. of (1:3) water-dioxane solution. The upper organic layer is separated and slowly poured into 2 liters of methanol. The granular precipitate is washed in fresh methanol, filtered by suction and dried in vacuo at 40° C. Yield 56.3 g.

*Analysis.*—Calcd.: Cl, 23.2%. Found: Cl, 17.1% $\{\eta\}^1$ in benzene 0.18%.

To a solution of 15 g. of copoly(styrene:vinylbenzyl chloride) dissolved in 150 ml. of benzyl alcohol is added 15 g. of 3-(N,N-dimethylamino)-2,2-dimethylpropionaldehyde. The solution is stirred at ambient temperature for 62 hours. The polymer dope is poured into 1.5 liters of stirred diethyl ether. The precipitate is washed and hardened in fresh diethyl ether, filtered, and dried in vacuo at room temperature. Yield 29 g. of water-soluble product. (Compound VI in Table I.)

*Analysis.*—Calcd.: Cl, 9.2%; N, 3.6%; CHO, 7.6%; Found: Cl., 8.7%; N, 2.3%; CHO, 3.1%.

EXAMPLE II

Preparation of copoly(vinyl chloroacetate:N-vinyloxycarbomethyl - N,N - dimethyl - N - benzylammonium chloride)

In a 500 ml. three-neck flask, fitted with mechanical stirrer and condenser is prepared a solution of 24 g. (0.2 mole) of poly(vinyl chloroacetate) in 250 ml. of dimethylformamide. To this solution is added 20.25 g. (0.15 mole) of N,N-dimethylbenzylamine and the solution is stirred at ambient temperature for 18 hours resulting in a solid liquid mixture. The liquid is decanted and the precipitate is dissolved in 150 ml. of methanol. The methanol dope is poured into 2 liters of acetone and the resulting precipitate is washed in 2 liters of fresh acetone, filtered by suction, and dried at room temperature under reduced pressure. Yield 22.5 g. of water-soluble product. (Compound XXI in Table I.)

[1] $\{\eta\}$=Inherent viscosity (0.25 gr. per 100 ml. of solution).

*Analysis.*—Calcd.: Cl, 15.9%; N, 4.7%. Found: Cl, 14.2%; N, 4.8%.

EXAMPLE III

Preparation of copoly[vinyl alcohol:vinyl N-(beta-pyridinium propionyl)carbamate chloride]

Into a 300 ml. three-neck flask fitted with mechanical stirrer, condenser, and steam bath are placed 150 ml. of dimethylacetamide and 8.8 g. (0.2 mole) of poly(vinyl alcohol) (Elvanol 70–05). This mixture is stirred and heated to 96° C. at which time 13.3 g. (0.1 mole) of 3-chloropropionyl isocyanate is added in bulk. An exothermic reaction gives a homogeneous solution, which is stirred and heated at, or slightly above 96° C. for ¼ hour. The hot reaction solution is filtered by suction and the filtrate is poured into 2 liters of diethyl ether. The precipitate is washed in 1.5 liters of fresh diethyl ether and redissolved in 150 ml. of dimethylformamide. Dry pyridine (100 ml.) is added and the solution is heated and stirred at 96° C. for 3 hours. The liquid phase is decanted and the precipitate is dissolved in 250 ml. of methanol. The methanol dope is poured into 3 liters of diethyl ether with mechanical stirring. The precipitate is filtered by suction, washed in fresh diethyl ether, filtered and dried at reduced pressure at room temperature. Yield 19 g. of water-soluble product. (Compound XXIV in Table I.)

*Analysis.*—Calcd.: Cl, 11.8%; N, 9.3%. Found: Cl, 9.5%; N, 7.0%.

EXAMPLE IV

Preparation of copoly[vinyltoluene-vinylbenzylbromide]

Into a 500 ml. one-neck flask, fitted with condenser, and maintained under a nitrogen atmosphere is placed 100 g. of distilled vinyltoluene (mixed isomers), 50 ml. benzene, and 0.50 g. benzoyl peroxide. The flask is immersed into an 80° C. constant temperature bath for 18 hours. The viscous dope is diluted with 100 ml. benzene and poured into 3 liters of methanol. The poly(vinyltoluene) precipitate is hardened and washed in 1 liter of fresh methanol. The precipitate is filtered and dried in vacuo at room temperature. Yield 85 g. $\{\eta\}$ 0.31 in EtCl₂.

To a solution of 79 g. of poly(vinyltoluene) in 600 ml. of benzene in a 2-liter, three-neck flask fitted with mechanical stirrer, condenser and steam bath is added 118 g. of N-bromo succinimide and 1 g. of benzoyl peroxide. The mixture is then stirred and heated at reflux for 4 hours at which time 200 ml. of benzene is distilled off and the dope is gravity-filtered to remove the precipitated succinimide. The filtrate is precipitated in methanol and washed and dried in vacuo at 35–40° C. Yield of copoly(vinytoulene-vinylbenzyl bromide) is 106 g., or 81.5 percent which is used as a starting material for Example VIII.

*Analysis.*—Calcd.: Br, 40.8%. Found: Br, 36.5%.

EXAMPLE V

Preparation of terpoly[styrene:N-(3-acrylamidopropyl)-N,N-dimethyl-N-benzylammonium chloride:N-(3-acrylamidopropyl) - N,N - dimethyl - N-(4-chloromethyl) benzylammonium chloride]

In a 500 ml. three-neck flask fitted with a mechanical stirrer, condenser, thermometer and steam bath is prepared a solution of 14 g. (0.034 mole) of copoly(styrene: dimethylamino-proplyacrylamide) in 250 ml. of benzyl alcohol. This solution is stirred at 96° C. as 4.27 g. (0.034 mole) of alpha-chlorotoluene is added in bulk. The solution is stirred at 96° C. for 1 hour. This hot reaction solution is then added dropwise over a 1 hour period to a stirred 96° C. solution of 17.5 g. (0.1 mole) of alpha, alpha'-dichloro-p-xylene dissolved in 250 ml. of benzyl alcohol. The reaction solution is stirred at 96° C. for 1 hour and cooled to room temperature. The dope is poured into 4 liters of stirred diethyl ether. The precipitate is washed and hardened in 500 ml. diethyl ether. The precipitate is filtered by suction and dried at room temperature under reduced pressure. Yield 24.1 g. of water-soluble product.

*Analysis.*—Calcd.: Cl, 14.8%; N, 7.8%. Found: Cl, 9.6%; N, 5.9%.

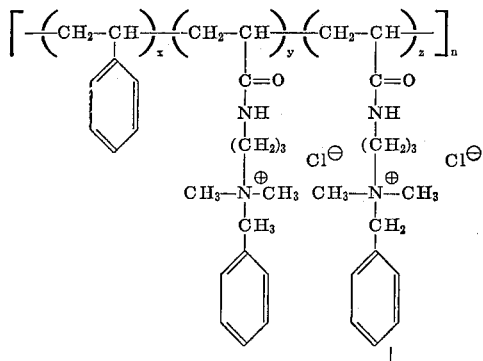

EXAMPLE VI

Preparation of copoly[styrene:N-(3-acrylamidopropyl)-N,N - dimethyl - N - vinyloxycarbomethylammonium chloride]

Into a 300 ml. one-neck flask fitted with magnetic stirrer is placed a solution of 13 g. (0.05 mole) of copoly (styrene:3-dimethylaminopropylacrylamide) dissolved in 100 ml. of dimethylformamide. To this solution is added 2 g. of hydroquinone and 12 g. (0.1 mole) of vinyl chloroacetate. The solution is then stirred at ambient temperature for 18 hours. The dope is poured into 1 liter of ethyl acetate, the precipitate is washed in acetone and dried at room temperature under reduced pressure for 2 hours after which the precipitate (20 g. yield) is dissolved in distilled water and submitted for testing. (Compound X in Table 1).

*Analysis.*—Calcd.: Cl, 9.3%; N, 7.4%. Found: Cl, 7.0%; N, 7.6%.

EXAMPLE VII

Preparation of copoly[vinyltoluene:N-vinylbenzyl-N,N-diethyl-N-(4-chloromethyl)benzylammonium chloride]

A solution of 19.5 g. of coply(vinyltoluene:vinylbenzyl bromide) in 400 ml. p-dioxane is prepared in a 950 ml. bottle. To this solution is added 14.6 g. of diethylamine. The bottle is sealed and placed on a tumbler at ambient temperature for 3 hours. The amine hydrobromide is filtered off and the filtrate concentrated to 250 ml. The dioxane dope is then poured into 1 liter of distilled $H_2O$ and the taffy-like precipitate is washed with two 1-liter portions of distilled water. The precipitate is filtered and dissolved in 150 ml. of benzyl alcohol at 60° C. To this solution is added 35 g. of alpha,alpha'-dichloro-p-xylene dissolved in 350 ml. of 90° C. benzyl alcohol. The resulting solution is stirred at 90–95° C. for 1 hour, then poured into 3 liters of stirred diethyl ether. The ether is decanted and the precipitate washed in 2 liters of acetone. The precipitate is filtered and immediately dissolved in 100 ml. distilled water. Yield 120 g. of solution, solids 9.8 percent.

*Analysis.*—Calcd.: Cl, 19.5%; N, 3.9%. Found: Cl, 11.3%; N, 4.1% {η} in water 1.40%.

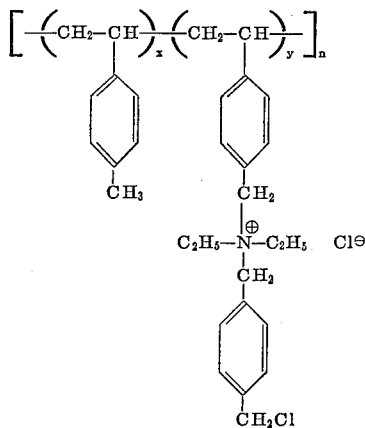

EXAMPLE VIII

Preparation of copoly[styrene:N-(3-acrylamidopropyl)-N,N - dimethyl - N-(4-chloromethyl)benzylammonium chloride]

In a 500 ml. three-neck flask fitted with a condenser, mechanical stirrer, thermometer and a steam bath is prepared a solution of 17.5 g. (0.1 mole) of alpha,alpha'-dichloro-p-xylene in 250 ml. benzyl alcohol at 90° C. To this solution is added 14 g. (0.034 mole) of copoly (styrene:dimethylaminopropylacrylamide). The mixture is stirred at 90° C. for 1 hour resulting in a homogeneous solution. The dope is filtered by suction while still hot and is then poured into 2 liters of manually stirred diethyl ether. The white precipitate is hardened and washed in fresh diethyl ether, filtered by suction, and dried in vacuo at room temperature. Yield 24 g. 92.5 percent yield of water-soluble product. (Compound I of Table I.)

EXAMPLE IX

Quaternization of copoly[styrene:dimethylaminopropylmaleimide] with 1,4-bis(chloromethyl)benzene To a solution of 10.5 g. of 1,4-bis(chloromethyl) benzene in 100 ml. benzyl alcohol, heated on a steam bath is added dropwise with stirring, over a period of three hours, a solution of 6 g. of copoly(styrene:dimethylaminopropylmaleimide) in 60 ml. of dimethylformamide. After addition, the mixture is stirred for an additional 4 hours. Some gelatinous material in suspension is filtered off on a sintered glass funnel. The filtrate is precipitated in diethyl ether, washed with acetone, and vacuum dried. It is then redissolved in methanol, precipitated in diethyl ether, washed with acetone, and vacuum dried. Yield 6 g. of white fibers, soluble in methanol and warm water.

*Analysis.*—Calcd.: C, 65.2%; H, 6.5%; N, 6.1%; Cl, 15.4%. Found: C, 63.9%; H, 6.6%; N, 5.8%; Cl, 11.4%.

EXAMPLE X

Quaternization of copoly(2-methylpentene:dimethylaminopropylmaleimide) with 1,4-bis(chloromethyl)benzene To a solution of 20 g. of 1,4-bis(chloromethyl)benzene in 200 ml. benzyl alcohol, heated on a steam bath is added dropwise over a period of 3 hours with stirring, a solution of 5 g. of copoly(2-methylpentene:dimethylaminopropylmaleimide) in 50 ml. of dimethylformamide. Following addition, the solution is heated for an additional hour, cooled, filtered, precipitated in diethyl ether, washed with acetone and vacuum dried. The residue is dissolved in methanol, precipitated in diethyl ether, washed, and vacuum dried. Yield 10 g. white solid, soluble in water and methanol. (Compound XVII of Table I.)

*Analysis.*—Calcd.: C, 62.6%; H, 7.7%; N, 6.4%; Cl, 16.1%. Found: C, 61.0%; H, 8.0%; N, 6.4%; Cl, 14.8%.

EXAMPLE XI

Quaternization of copoly(tetramethylbutadiene:dimethylaminopropylmaleimide) with 1,4-bis(chloromethyl)benzene A solution of 7.5 g. of copoly(tetramethylbutadiene: dimethylaminopropylmaleimide) in 75 ml. of dimethylformamide was added dropwise with stirring over a period of 3 hours to a hot solution of 30 g. of 1,4-bis(chloromethyl)benzene in 300 ml. of benzyl alcohol. Following addition, the mixture is heated for an additional hour, cooled, filtered, precipitated in diethyl ether, and vacuum dried. The residue is dissolved in methanol, precipitated in diethyl ether, washed, and vacuum dried. Yield 20 g. of white solid. (Compound XVIII of Table I.)

*Analysis.*—Calcd.: C, 64.3%; H, 7.7%; N, 6.0%; Cl, 15.0%. Found: C, 61.4; H, 7.7%; N, 6.6%; Cl, 15.4%.

EXAMPLE XII

Quaternization of copoly(styrene:dimethylaminopropylmaleimide) with 1,3-bis(chloromethyl)benzene A solution of 8 g. of copoly(styrene:dimethylaminopropylmaleimide) in 80 ml. of dimethylformamide is added dropwise over a period of three hours to a heated, stirred solution of 32 g. of 1,3-bis(chloromethyl)benzene in 300 ml. of benzyl alcohol. Following addition, the mixture is heated for an additional 3 hours, cooled, filtered, precipitated in diethyl ether, washed with diethyl ether and acetone, and vacuum dried. The residue is redissolved in methanol, precipitated in diethyl ether and vacuum dried. Yield 9 g. of white powder, soluble in methanol and warm water.

*Analysis.*—Calcd.: C, 65.1%; H, 6.5%; N, 6.1%; Cl, 15.4%. Found: C, 63.2%; H, 6.8%; N, 6.2%; Cl, 12.1%.

EXAMPLE XIII

Quaternization of copoly(styrene:dimethylaminopropylmaleimide) with benzyl chloride and 1,4-bis(chloromethyl)benzene A solution of 7.5 g. of copoly(styrene:dimethylaminopropylmaleimide) in 75 ml. dimethylformamide is added dropwise with stirring over a period of 3 hours to a heated solution of 10 g. (0.08 mole) of benzyl chloride and 14.0 g. (0.08 mole) of 1,4-bis(chloromethyl)benzene in 250 ml. of benzyl alcohol. (Compound XIII of Table I.)

The product is isolated and purified as in the preceding examples. Yield 7.0 g.

*Analysis.*—Calcd. for an equimolar quaternization reaction: C, 66.7%; H, 6.8%; N, 6.4%; Cl, 12.3%. Found: C, 66.3%; H, 7.6%; N, 6.1%; Cl, 10.6%.

EXAMPLE XIV

Quaternization of copoly(styrene:dimethylaminoethyl methacrylate) with 1,4-bis(chloromethyl)benzene A solution of 10 g. of copoly(styrene:dimethylaminoethyl methacrylate) in 100 ml. benzyl alcohol is added dropwise with stirring to a heated solution of 20 g. of 1,4-bis(chloromethyl)benzene in 200 ml. of benzyl alcohol over a period of 3 hours.

Isolation and purification as in the previous examples gives 11 g. of white solid soluble in water and methanol. (Compound XIX of Table I.)

*Analysis.*—Calcd.: C, 66.2%; H, 7.1%; N, 3.2%; Cl, 16.3%. Found: C, 67.0%; H, 7.6%; N, 3.7%; Cl, 10.0%.

EXAMPLE XV

Quaternization of copoly(styrene:dimethylaminopropylmaleimide) with 1,4-bis(methanesulfonoxy)butane A solution of 10 g. of copoly(styrene:dimethylaminopropylmaleimide) in 100 ml. of dimethylformamide is added dropwise with stirring over a period of 3 hours to a solution of 25 g. of 1,4-bis(methanesulfonoxy)butane in 250 ml. of benzyl alcohol.

Isolation and purification as in the previous examples gives 15 g. of product soluble in water and methanol.

*Analysis.*—Calcd.: C, 51.1%; H, 6.8%; N, 8.3%; S, 12.2%. Found: C, 52.1%; H, 7.6%; N, 8.2%; S, 10.6%.

EXAMPLE XVI

Quaternization of copoly(styrene:dimethylaminopropylmaleimide) with methyl-p-toluenesulfonate then 1,4-bis(chloromethyl)benzene Methyl-p-toluenesulfonate (1.7 g. 0.00875 mole) is added to a solution of 5.0 g. (0.0175 mole) of copoly (styrene:dimethylaminopropylmaleimide) in 50 ml. of dimethylformamide. The mixture is allowed to stand overnight at room temperature. Addition of a few drops to water gave no precipitation. The solution is added dropwise with stirring over a period of 2 hours to a heated solution of 10 g. (0.057 mole) of 1,4-bis(chloromethyl) benzene in 100 ml. of benzyl alcohol.

Isolation and purification as in the previous examples gives 8 g. of solid product soluble in water and methanol and insoluble in acetone. (Compound XIV of Table I.)

EXAMPLE XVII

Quaternization of copoly(styrene:dimethylaminopropylmaleimide) with chlorobutyraldehyde A solution of 5 g. of copoly(styrene:dimethylaminopropylmaleimide) and 8 g. of chlorobutyraldehyde diethylacetal in 50 ml. benzyl alcohol and 50 ml. dimethylformamide is heated to 115° C. under nitrogen for 6 hours. Addition of a small portion of the solution to acetone gives a precipitate which is soluble in water. The solution is precipitated in diethyl ether, washed four times with acetone and pressed as dry as possible on a filter. The cake is dissolved in 50 ml. of water and the solution filtered. Hydrochloric acid (0.5 N) is added to bring the pH to 2.0 and the mixture allowed to stand for 1 hour. The solution is then evaporated on a Rinco apparatus at room temperature to remove acetone, alcohol and some water, and diluted with water again and the evaporation repeated.

The solution (62 g.) is sent as such (7 percent solids) for testing.

A small portion is concentrated to a small volume, precipitated in acetone, washed and vacuum dried for analysis. (Compound XV of Table I.)

*Analysis.*—Found: C, 67.2%; H, 8.2%; N, 8.5%; Cl, 7.5%; ethoxyl, 1.2%.

EXAMPLE XVIII

Preparation of copoly[N-vinyloxycarbomethyl-N,N-dimethyl - N - acrylamidopropylammonium chloride:(N-vinyloxycarbomethyl - N,N - dimethyl - N - benzylammonium chloride)]

To a solution of 36 g. of poly(vinyl chloroacetate) in 500 ml. of dimethylformamide is added 20.25 g. of dimethylbenzylamine. The mixture is tumbled overnight at room temperature. It is then precipitated in diethyl ether, washed with acetone and vacuum dried. Yield 56.7 g.

*Analysis.*—Calcd.: C, 54.1%; H, 5.7%; N, 3.7%; Cl, 18.9%. Found: C, 53.6%; H, 6.4%; N, 3.6%; Cl, 19.2%.

A solution of 10 g. of this product in 150 ml. of dimethylformamide is treated with 7.7 g. dimethylaminopropylacrylamide. The mixture is tumbled overnight, precipitated in diethyl ether, washed with acetone and vacuum dried. Yield 10 g. (Compound XXIII of Table I.)

*Analysis.*—Calcd.: C, 56.2%; H, 7.4%; N, 7.9%; Cl, 13.3%. Found: C, 56.1%; H, 7.4%; N, 6.6%; Cl, 12.9%.

EXAMPLE XIX

Preparation of copoly[N-vinyloxycarbomethyl-N,N-dimethyl-N-benzylammonium chloride:1-methyl-1-vinyloxycarbomethyl - 4 - (3 - carboxyethylenecarbamidopropyl)piperazinium monochloride]

To a solution of 9.48 g. of copoly[vinyl chloroacetate: N-vinyloxycarbomethyl - N,N - dimethyl-N-benzylammonium chloride] in 200 ml. of benzyl alcohol is added 9.4 g. of 1-methyl-4-(3-carboxyethylenecarbamidopropyl)piperazine. The mixture is tumbled overnight, precipitated in diethyl ether, washed and vacuum dried. Yield 10.0 g. (Compound XXVI of Table I.)

*Analysis.*—Calcd.: C, 54.5%; H, 7.2%; Cl, 11.4%; N, 9.1%. Found: C, 59.7%; H, 7.1%; Cl, 7.2%; N, 7.0%.

EXAMPLE XX

Preparation of copoly(N-vinyloxycarbonylmethyl-N-3-acrylamidopropyl-N,N-dimethylammonium chloride: N-vinyloxycarbonylmethyl - N,N - dibenzyl - N - ethylammonium chloride To a solution of 12.0 g. (0.1 mole) of poly(vinyl chloroacetate) dissolved in 80 ml. of dimethylformamide are added 7.3 g. (0.05 mole) of 3-(N,N-dimethylamino)propylacrylamide and 11.3 g. (0.05 mole) of N-ethyldibenzylamine. The solution is tumbled at 30° C. for 18 hours. The dimethylformamide is decanted from the precipitate quaternary which is then dissolved in 100 ml. of methanol. The methanol dope is then poured into 2 liters of diethyl ether. The precipitate is filtered off, washed in acetone and dissolved in distilled water for testing. Yield 129 g. solution at 10.1 percent solids. (Compound XXVII in Table I.)

*Analysis.*—Calcd.: Cl, 11.4%; N, 6.8%. Found: Cl, 14.4%; N, 5.8%.

Mordanting amounts of the novel polymers of the invention may be incorporated in water-permeable hydrophilic organic colloids or other polymeric binder materials and the resulting mixture used in the preparation of dye imbibition printing blanks and receiving layers for color transfer processes, such as those described in Rogers U.S. Pat. 2,983,606, Whitmore U.S. Pat. 3,227,552 and U.S. Pat. 3,227,550, and Minsk 2,882,156. Satisfactory colloids which can be used for this purpose include any of the hydrophilic colloids generally employed in the photographic field which contains primary and secondary amine groups, including, for example, gelatin, colloidal albumin, derivatives of polysaccharides, cellulose derivatives, synthetic resins such as amine containing polyvinyl compounds, acrylamide polymers and the like. In addition to the hydrophilic colloids, the binding agent can contain colloids such as dispersed polymerized vinyl compounds, particularly those which increase the dimensional stability of photographic materials. Suitable compounds of this type include water-insoluble polymers and copolymers of alkyl acrylates or methacrylates.

The quantity of the novel polymers employed as mordants in water-permeable colloids can be varied, depending upon the particular polymer and its chemical characteristics, as well as the dyes to be fixed in the mordanting layer. In general, the quantity of novel polymer should be at least 10% by weight, based on the weight of the hydrophilic colloid. Larger amounts of novel polymer can be employed in the hydrophilic colloid layers and amounts as high as 50% by weight, based on the weight of the hydrophilic colloid, give quite useful results.

The polymeric mordants of the invention can also be used for fixing the dyes and particularly acid dyes used in the preparation of photographic filter, antihalation, and gelatino-silver-halide emulsion layers. Such layers can be coated on conventional photographic supports, such as flexible sheet supports (e.g., cellulose acetate, polyester films, polyvinyl resins, etc.) or paper, glass, etc.

The emulsions containing the polymers of the invention can be chemically sensitized with compounds of the sulfur group, noble metal salts such as gold salts, reduction sensitized with reducing agents, and combinations of these. Furthermore, emulsion layers and other layers present in photographic elements made according to this invention can contain additional hardeners such as aldehyde hardeners, aziridine hardeners, hardeners which are derivatives of dioxane, oxypolysaccharides such as oxystarch, oxy plant gums, and the like. The emulsion can also contain additional additives, particularly those known to be beneficial in photographic emulsions, including for example, stabilizers or antifoggants, particularly the water soluble inorganic acid salts of cadmium, cobalt, manganese and zinc as disclosed in U.S. Pat. 2,829,404, the substituted triazaindolizines as disclosed in U.S. Pats. 2,444,605 and 2,444,607, speed increasing materials, plasticizers and the like.

Mordanted blanks treated in accordance with this invention are useful for receiving acid dyes from hydrophilic colloid relief images according to prior art techniques. Any suitable acid dyestuff may be transferred to the treated blanks of the invention, such as Anthracene Yellow GR (400% pure Schultz No. 177), Fast Red S Conc. (Colour Index 176), Pontacyl Green SN Ex. (Colour Index 737), Acid blue black (Colour Index 246), Acid Magenta O (Colour Index 692), Naphthol Green B Conc. (Colour Index 5), Brilliant Paper Yellow Ex. Conc. 125% (Colour Index 364), Tartrazine (Colour Index 640), Metanil Yellow Conc. (Colour Index 138), Pontacyl Carmine 6B Ex. Conc. (Colour Index 57), Pontacyl Scarlet R Conc. (Colour Index 487) and Pontacyl Rubine R Ex. Conc. (Colour Index 179).

The mordants of this invention are evaluated against a control containing similar concentrations of the guanyl hydrazone of poly(methyl vinyl ketone) of U.S. Patent 2,945,006 for their hardening action and degree of matrix poisoning in the Imbibition Dye Transfer Process as follows:

To a fine grain silver bromoiodide emulsion containing 295 g. of gelatin/mole of silver halide, there is added some saponin solution as a coating aid, 42 cc. of 50 percent aqueous glycerine, and 17.5 cc. of a 10 percent formaldehyde solution. The emulsion is coated on a cellulose ester support at a coverage of approximately 390 mg. of silver/ft.$^2$.

Mordant (1.2 g.) and gelatin (2.7 g.) are dissolved at 40° C. in sufficient water to make a total weight of 100 g. of solution and the pH of the solution is adjusted to 4.2. To the comparison samples which do not contain anchoring groups and to several other samples containing the mordants of the invention which would not harden sufficiently to complete the testing procedure, 0.17 cc. of a 10 percent aqueous solution of formaldehyde is added as a hardener. Those samples requiring this additional hardener are indicated in Table II. The mordant solution is then coated over the fine grain silver bromoiodide emulsion layer described above at a coverage of 260 mg. of gelatin/ft.$^2$.

A series of six transfers of dye are made from a gelatin relief matrix onto strips of the film coating containing the mordant. A few matrix is used for each series of transfers.

After the six transfers are made, the minimum density of the matrix is measured through a filter complementary in color to that of the transferred dye. The minimum density of the unused matrix is subtracted from this density to give the dye stain on the matrix which is taken as an indication of the degree of matrix poisoning.

The matrix for each transfer is dyed for 2 minutes 50 seconds in an acid dye bath at a temperature of 90° F. The dyed matrix is removed from the dye bath, allowed to drain 10 seconds, washed for 15 seconds in running water at a temperature of 80° F. and immediately blown off with an air squeegee to remove surface water. The dyed matrix is then rolled into contact with a strip of the mordanted film coating which has been soaked in distilled water for 1 minute 15 seconds at room temperature. The two strips are held in contact for 45 seconds while maintaining the temperature at 105° F. At the end of 45 seconds the matrix and transfer are separated. The mordanted coating containing the transferred dye image is placed in a non-hardening acid fix bath to remove the silver halide after which it is given a short wash and dried. The matrix is then washed approximately for 1 minute in running water, squeegeed and redyed for the next transfer in the series.

The compounds tested are identified in Table I and the testing results are recorded in Table II. The quality in definition is recorded in Table II as compared to the guanyl hydrazone of poly(methyl vinyl ketone) as a control mordant.

TABLE I

| General Formula | Cmpd. | R | X⊖ |
|---|---|---|---|
| $[-(CH_2-CH)_x-(CH_2-CH)_y-]_n$ with phenyl on first unit; second unit has $-C(=O)-NH-(CH_2)_3-N^{\oplus}(CH_3)(CH_3)R$ $X^{\ominus}$ | I | $Cl-CH_2-C_6H_4-CH_2-$ | Cl⊖ |
| | II | $\{C_6H_5-CH_2-$ and $Cl-CH_2-C_6H_4-CH_2-\}$ | Cl⊖ |
| | III | $CH_2=CH-O-C(=O)-CH_2-$ | Cl⊖ |
| | IV | $CH_2=CH-C(=O)-O-CH_2-$ | Cl⊖ |
| Control | V | $CH_3-$ | $^{\ominus}SO_3-C_6H_4-CH_3$ |
| $[-(CH_2-CH)_x-(CH_2-CH)_y-]_n$ with phenyl on first unit; second unit has $-CH_2-C(CH_3)_2-CHO$ pendant and $-N^{\oplus}(CH_3)(CH_3)R$ $X^{\ominus}$ | VI | $CH_3-C(CH_2-)(CH_3)-CHO$ | Cl⊖ |
| | VII | $Cl-CH_2-C_6H_4-CH_2-$ | Cl⊖ |
| Control | VIII | $CH_3-$ | Cl⊖ |
| $[-(CH_2-CH)_x-(CH_2-CH)_y-]_n$ with phenyl on first unit; second unit has $-C(=O)-NH-(CH_2)_3-N^{\oplus}(CH_3)(CH_3)R$ $X^{\ominus}$ | IX | $\{C_6H_5-CH_2-$ and $Cl-CH_2-C_6H_4-CH_2-\}$ | Cl⊖ |
| | X | $CH_2=CH-O-C(=O)-CH_2-$ | Cl⊖ |
| | XI | $Cl-CH_2-C_6H_4-CH_2-$ | Cl⊖ |
| $[-(CH_2-CH)_x-(CH-CH)_y-]_n$ with phenyl substituent; second unit contains cyclic imide $-C(=O)-N(-(CH_2)_3-N^{\oplus}(CH_3)(CH_3)R)-C(=O)-$ $X^{\ominus}$ | XII | $Cl-CH_2-C_6H_4-CH_2-$ | Cl⊖ |

| General Formula | Cmpd. | R | X⁻ |
|---|---|---|---|
| | XIII | {C₆H₅-CH₂-, Cl-CH₂-C₆H₄-CH₂-} | Cl⁻ |
| | XIV | {CH₃-, Cl-CH₂-C₆H₄-CH₂-} | {CH₃-C₆H₄-SO₃⁻, Cl⁻} |
| | XV | -(CH₂)₃-CHO | Cl⁻ |
| Control | XVI | CH₃- | CH₃-C₆H₄-SO₃⁻ |
| [-(CH₂-C(CH₃))ₓ-(CH-CH)ᵧ-]ₙ with (CH₂)₂-CH₃ side chain and succinimide ring N-(CH₂)₃-N⁺(CH₃)₂R X⁻ | XVII | Cl-CH₂-C₆H₄-CH₂- | Cl⁻ |
| [-(C(CH₃)₂-CH=CH-C(CH₃)₂)ₓ-(CH-CH)ₓ-]ₙ with succinimide ring N-(CH₂)₃-N⁺(CH₃)₂R X⁻ | XVIII | Cl-CH₂-C₆H₄-CH₂- | Cl⁻ |
| [-(CH₂-CH(C₆H₅))ₓ-(CH₂-C(CH₃))ᵧ-]ₙ with C(=O)-O-(CH₂)₂-N⁺(CH₃)₂R X⁻ | XIX | Cl-CH₂-C₆H₄-CH₂- | Cl⁻ |
| Control | XX | CH₃- | CH₃-C₆H₄-SO₃⁻ |
| [-(CH₂-CH(O-C(=O)-CH₂-Cl))ₓ-(CH₂-CH(O-C(=O)-CH₂-N⁺(CH₃)₂R))ᵧ-]ₙ X⁻ | XXI | C₆H₅-CH₂- | Cl⁻ |
| [-(CH₂-CH(O-C(=O)-CH₂-N⁺(CH₃)₂R))ₓ-(CH₂-CH(O-C(=O)-CH(N⁺(CH₂-φ)₂R')))ᵧ-]ₙ 2X⁻ | XXII | {R=(CH₂=CH-C(=O)-NH-(CH₂)₃-), R'=(C₂H₅-)} | Cl⁻ |

TABLE I—Continued

| General Formula | Cmpd. | R | X⁻ |
|---|---|---|---|
| 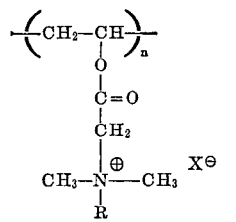 | XXIII | 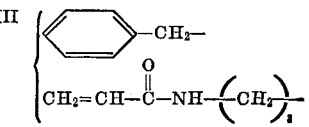 | Cl⁻ |
| 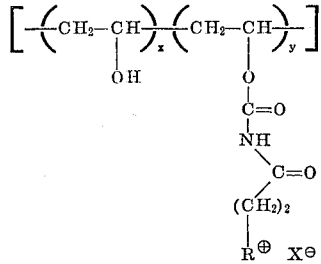 | XXIV | 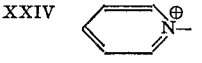 | Cl⁻ |
| 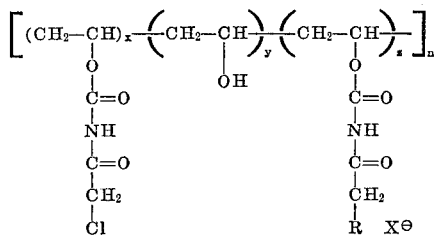 | XXV | 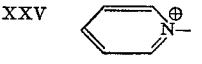 | Cl⁻ |
| 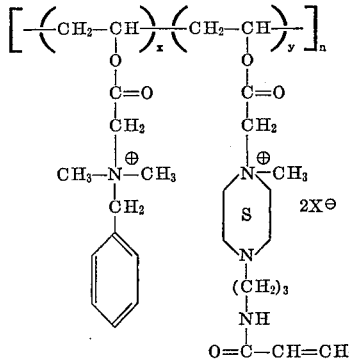 | XXVI | ———————————— | Cl⁻ |
| 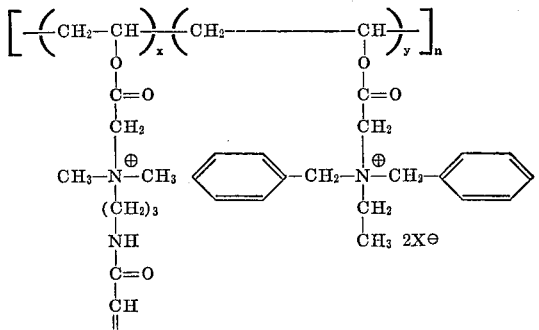 | XXVII | ———————————— | Cl⁻ |

TABLE II.—MORDANTING RESULTS

| Compound | Matrix Stain | Definition | Hardening |
|---|---|---|---|
| I | 0.03 | Less than control | Rapid. |
| II | 0.02 | Greater than control | Satisfactory. |
| III | 0.07 | Less than control | Do. |
| IV | 0.09 | Equals control | Do. |
| V (for comparison) | 0.11 | | Requires additional hardener. |
| VI | 0.04 | Greater than control | Satisfactory. |
| VII | 0.02 | Much greater than control. | Do. |
| VIII (for comparison) | (¹) | | Required additional hardener. |
| IX | 0.08 | Greater than control | Satisfactory. |
| X | 0.07 | Less than control | Do. |
| XI | 0.03 | Much greater than control. | Rapid. |

TABLE II.—MORDANTING RESULTS—Continued

| Compound | Matrix stain | Definition | Hardening |
|---|---|---|---|
| XII | 0.03 | Greater than control | Satisfactory. |
| XIII | 0.01 | Good | Do. |
| XIV | 0.02 | Greater than control | Do. |
| XV | 0.04 | do | Do. |
| XVI (for comparison) | 0.06 | | Required additional hardener. |
| XVII | 0.02 | Greater than control | Satisfactory. |
| XVIII | 0.03 | do | Do. |
| XIX | 0.02 | Good | Do. |
| XX (for comparison) | 0.11 | | Required additional hardener. |
| XXI | 0.03 | Much greater than control. | Satisfactory. |
| XXII | 0.01 | Greater than control | Do. |
| XXIII | 0.03 | Equals control | Do. |
| XXIV | 0.08 | Greater than control | Required additional hardening. |
| XXV | 0.02 | Equals control | Do. |
| XXVI | 0.01 | Less than control | Satisfactory. |
| XXVII | 0.01 | Less than control | Do. |

[1] Very bad image poisoning. Image poisoning is a loss of dye-transfer ability by the matrix. This results in transferred images having uneven density, which decreases with each transfer.

Several of the mordants of this invention are introduced into gelatin-silver halide photographic emulsions to determine the degree of reaction with gelatin. The data obtained indicate that the mordants of the invention react with the gelatin and are thereby anchored firmly to the gelatin carrier when incorporated as mordants in gelatin layers.

Samples of the mordants of the invention are added to separate portions (in concentrations indicated in Table III) of a high speed silver bromoiodide emulsion which are panchromatically sensitized with a cyanine dye. Each emulsion sample is coated on a cellulose acetate film support at a coverage of 459 mg. of silver and 1040 mg. of gelatin per square foot. A sample of each film coating is exposed on an Eastman IB sensitometer, processed for five minutes in Kodak DK-50 Developer, fixed, washed, and dried. The samples are tested after 3 days incubation at 120° F./50 percent relative humidity, by immersing in water at 25° C. for 3 minutes and calculating the percent swell of the emulsion. The swell data is recorded in Table III.

TABLE III

| Compound | Concentration, g./mole Ag | Swell |
|---|---|---|
| VI | Control | 640 |
| | 7.2 | 530 |
| | 14.4 | 440 |
| | 24.0 | 330 |
| IX | Control | 670 |
| | 7.2 | 580 |
| | 14.4 | 490 |
| | 24.0 | 450 |
| X | Control | 640 |
| | 7.2 | 540 |
| | 14.4 | 500 |
| | 24.0 | 460 |
| XIII | Control | 660 |
| | 7.2 | 580 |
| | 14.4 | 480 |
| | 24.0 | 380 |
| XIV | Control | 670 |
| | 2.4 | 640 |
| | 7.2 | 560 |
| | 14.4 | 370 |
| XVII | Control | 640 |
| | 7.2 | 460 |
| | 14.4 | 400 |
| | 24.0 | 300 |
| XVIII | Control | 640 |
| | 7.2 | 500 |
| | 14.4 | 400 |
| | 24.0 | 310 |
| XIX | Control | 700 |
| | 2.4 | 640 |
| | 7.2 | 560 |
| | 14.4 | 440 |
| XXV | Control | 680 |
| | 7.2 | 580 |
| | 14.4 | 550 |

The invention has been described in considerable detail with reference to preferred embodiments thereof, but it will be understood that variations and modifications can be effected within the spirit and scope of the invention as described herein and as set forth in the appended claims.

We claim:

1. An element comprising a support, a silver halide emulsion, hydrophilic colloid and a polymer comprising at least 20 mole percent units having quaternary nitrogen groups and at least 20 mole percent units having anchoring groups reactive with the said hydrophilic colloid selected from the group consisting of aldehyde groups, chloroalkanoyl groups, chloroalkyl groups, vinyl sulfonoxy groups, pyridiniumpropionyl groups, alkyl sulfonoxy groups, vinyloxy groups and vinylcarbonyl groups.

2. An element comprising a support, at least one layer containing a silver halide composition, hydrophilic colloid and a polymer comprising at least 20 mole percent units having quaternary nitrogen groups and at least 20 mole percent units having anchoring groups reactive with said hydrophilic colloid selected from the group consisting of aldehyde groups, chloroalkanoyl groups, chloroalkyl groups, vinyl sulfonoxy groups, pyridiniumpropionyl groups, alkyl sulfonoxy groups, vinyloxy groups and vinyl carbonyl groups.

3. The element of claim 1 in which the said anchoring groups are reactive aldehyde groups, reactive chloroalkanoyl groups, reactive chloroalkyl groups, reactive vinyl sulfonyl groups, reactive pyridiniumpropionyl groups, reactive alkyl sulfonoxy groups, reactive vinyloxy groups or reactive vinylcarbonyl groups.

4. The element of claim 3 wherein said anchoring groups are reactive aldehyde groups.

5. The element of claim 3 wherein said anchoring groups are reactive chloroalkanoyl groups.

6. The element of claim 3 wherein said anchoring groups are reactive chloroalkyl groups.

7. The element of claim 3 wherein said anchoring groups are reactive vinyloxy groups.

8. The element of claim 3 wherein said anchoring groups are reactive vinylcarbonyl groups.

9. The element of claim 1 in which at least 20 mole percent of the units comprising said polymer contain reactive anchoring groups.

10. The element of claim 1 in which at least 20 mole percent of the units comprising said polymer contain quaternary nitrogen groups.

11. The element of claim 2 in which the said anchoring groups are reactive aldehyde groups, reactive chloroalkanoyl groups, reactive chloroalkyl groups, reactive vinyl sulfonyl groups, reactive pyridiniumpropionyl groups, reactive alkyl sulfonoxy groups, reactive vinyloxy groups or reactive vinylcarbonyl groups.

12. The element of claim 11 wherein said anchoring groups are reactive aldehyde groups.

13. The element of claim 11 wherein said anchoring groups are reactive chloroalkanoyl groups.

14. The element of claim 11 wherein said anchoring groups are reactive chloroalkyl groups.

15. The element of claim 11 wherein said anchoring groups are reactive vinyloxy groups.

16. The element of claim 11 wherein said anchoring groups are reactive vinylcarbonyl groups.

17. The element of claim 2 in which at least 20 mole percent of the units comprising said polymer contain reactive anchoring groups.

18. The element of claim 2 in which at least 20 mole percent of the units comprising said polymer contain quaternary nitrogen groups.

References Cited

UNITED STATES PATENTS

| | | | |
|---|---|---|---|
| 2,691,579 | 10/1954 | Fierke | 96—11 |
| 3,234,025 | 2/1966 | Van Hoof et al. | 96—95 |
| 2,675,316 | 4/1954 | Carroll et al. | 96—84 |
| 2,548,564 | 4/1951 | Sprague et al. | 96—84 |

NORMAN G. TORCHIN, Primary Examiner

E. C. KIMLIN, Assistant Examiner

U.S. Cl. X.R.

96—114

PO-1050
(5/69)

UNITED STATES PATENT OFFICE
CERTIFICATE OF CORRECTION

Patent No. 3,625,694   Dated December 7, 1971

Inventor(s) Hyman L. Cohen, James R. King, Jr. and Louis M. Minsk

It is certified that error appears in the above-identified patent and that said Letters Patent are hereby corrected as shown below:

Column 7, in the formula, lines 15-30, " 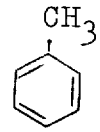 "

should read --- 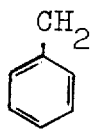 ---

Column 19, Table II, No. XXVII under the heading Definition, "Less than Control" should read ---Greater than Control---.

Signed and sealed this 1st day of August 1972.

(SEAL)
Attest:

EDWARD M. FLETCHER, JR.
Attesting Officer

ROBERT GOTTSCHALK
Commissioner of Patents

UNITED STATES PATENT AND TRADEMARK OFFICE
CERTIFICATE OF CORRECTION

PATENT NO. : 3,625,694
DATED : December 7, 1971
INVENTOR(S) : Hyman L. Cohen, James R. King, Jr., and Louis M. Minsk It is certified that error appears in the above-identified patent and that said Letters Patent are hereby corrected as shown below:

Col. 2, lines 30-31   "vinylsulfonoxy" should be --vinylsulfonyl--

Col. 20, lines 30-31 (Claim 1)   "vinylsulfonoxy" should be --vinylsulfonyl--

Col. 20, line 41 (Claim 2)   "vinyl sulfonoxy" should be --vinylsulfonyl--

Signed and Sealed this

Twenty-sixth Day of October 1976

[SEAL]

Attest:

RUTH C. MASON
*Attesting Officer*

C. MARSHALL DANN
*Commissioner of Patents and Trademarks*

UNITED STATES PATENT OFFICE
CERTIFICATE OF CORRECTION

PATENT NO. : 3,625,694
DATED : December 7, 1971
INVENTOR(S) : Hyman L. Cohen, James R. King, Jr. and Louis M. Minsk It is certified that error appears in the above-identified patent and that said Letters Patent are hereby corrected as shown below:

In column 13, second formula, the part of the formula reading "$\{CH_2-CH\}_y]_n$" should read --$\{CH_2-CH\}_y]_n$--.

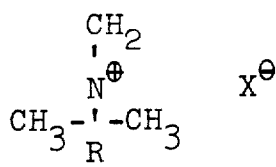 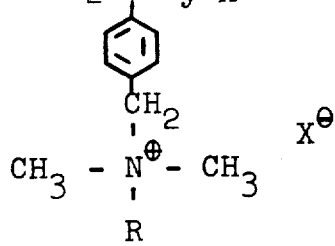

Signed and Sealed this

Twenty-second Day of May 1979

[SEAL]

Attest:

RUTH C. MASON
Attesting Officer

DONALD W. BANNER
Commissioner of Patents and Trademarks